United States Patent
Liao et al.

(10) Patent No.: US 12,227,646 B2
(45) Date of Patent: Feb. 18, 2025

(54) RESIN, COMPOSITION THEREOF AND COPPER CLAD LAMINATE MADE THEREOF

(71) Applicant: A.C.R. TECH CO., LTD., Taipei (TW)

(72) Inventors: Shih-Hao Liao, Taipei (TW); Min-Yuan Yang, Taipei (TW); Ya-Yen Chou, Taipei (TW); Jheng-Hong Ciou, Taipei (TW); Cheng-Chung Chen, Taipei (TW)

(73) Assignee: A.C.R. TECH CO., LTD., Taipei (TW)

( * ) Notice: Subject to any disclaimer, the term of this patent is extended or adjusted under 35 U.S.C. 154(b) by 283 days.

(21) Appl. No.: 18/075,363

(22) Filed: Dec. 5, 2022

(65) Prior Publication Data

US 2023/0193027 A1    Jun. 22, 2023

(30) Foreign Application Priority Data

Dec. 16, 2021   (TW) ................. 110147223

(51) Int. Cl.
| | | |
|---|---|---|
| C08L 79/04 | (2006.01) |
| B32B 5/02 | (2006.01) |
| B32B 5/26 | (2006.01) |
| B32B 15/14 | (2006.01) |
| B32B 15/20 | (2006.01) |

(52) U.S. Cl.
CPC .............. *C08L 79/04* (2013.01); *B32B 15/20* (2013.01); *B32B 5/02* (2013.01); *B32B 5/26* (2013.01); *B32B 15/14* (2013.01); *B32B 2260/023* (2013.01); *B32B 2260/046* (2013.01); *B32B 2262/101* (2013.01); *B32B 2307/306* (2013.01); *B32B 2307/5825* (2013.01); *B32B 2457/08* (2013.01)

(58) Field of Classification Search
None
See application file for complete search history.

(56) References Cited

PUBLICATIONS

Chen—benzoxazine resin—IDS—ACS Appl. Poly. Mat.—2019 (Year: 2019).*
Chen et al., *Design and Preparation of Benzoxazine Resin with High-frequency Low Dielectric Constants and Ultra-low Dielectric Losses.*, ACS Appl. Polym. Mater. Jan. 4, 2019, 625-630.

\* cited by examiner

*Primary Examiner* — John Vincent Lawler
(74) *Attorney, Agent, or Firm* — Muncy, Geissler, Olds & Lowe, P.C.

(57) ABSTRACT

A resin, including a compound having the following Formula 1-1:

(Formula 1-1)

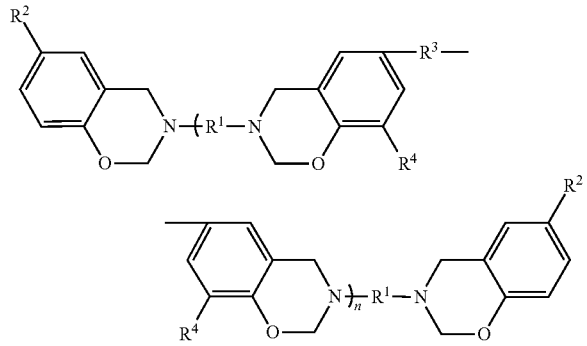

wherein n ranges from 1 to 5, and R1, R2, R3 and R4 are as defined herein.

3 Claims, No Drawings

RESIN, COMPOSITION THEREOF AND COPPER CLAD LAMINATE MADE THEREOF

FIELD OF THE INVENTION

The present invention relates to a resin, and in particular to a benzoxazine resin suitable for electronic components.

BACKGROUND OF THE INVENTION

Benzoxazine is a kind of nitrogen-bearing thermosetting resin having a structure similar to phenolic resin, and is a kind of six-membered heterocyclic compound system composed of O atoms and N atoms. Benzoxazine is generally a compound made from a phenolic compound, primary amine and a formaldehyde compound via Mannich reaction such that ring-opening polymerization is performed to generate a web structure similar to phenolic resin under the action of heating or a catalyst.

Benzoxazine resin has many advantages such as, low volume shrinkage (free of small-molecule by-products during the polymerization), low moisture absorption, excellent heat resistance, mechanical properties, electrical properties, and fire resistance. Therefore, the benzoxazine resin has been widely applied in the fields of matrix resin of composite materials, solvent-free immersion paint, electronic packaging material, flame retardant material, electrical insulating material and the like. Benzoxazine resin is the important material to produce Copper Clad Laminates (CCL).

Benzoxazine resins known in the art can be referring to 'Design and Preparation of Benzoxazine Resin with High-Frequency Low Dielectric Constants and Ultralow Dielectric Losses' (Appl. Polym. Mater. 2019, 1, 4, 625-630) published on the periodical Applied Polymer Materials in 2019 by Jiangbing Chen, et al. R1 disclosed in the benzoxazine resin of the reference is DAM containing methyl, thus resulting in poor machinability and high brittleness of the benzoxazine resin. Therefore, the benzoxazine resin is against the subsequent preparation into a copper clad laminate and a circuit board. Moreover, it is not easy to be processed and the practicability is low.

With the ever-increasing demands for circuit boards, nowadays, there is still a room for improvement of the copper clad laminates made from the existing benzoxazine resin in the properties of heat resistance, mechanical properties, dimensional stability, and the like.

SUMMARY OF THE INVENTION

The major objective of the present invention is to solve the problem that the properties of heat resistance, mechanical properties, and dimensional stability of the copper clad laminates made from the existing benzoxazine resin are to be improved.

To achieve the above objective, the present invention provides a resin, including a compound of the following Formula 1-1:

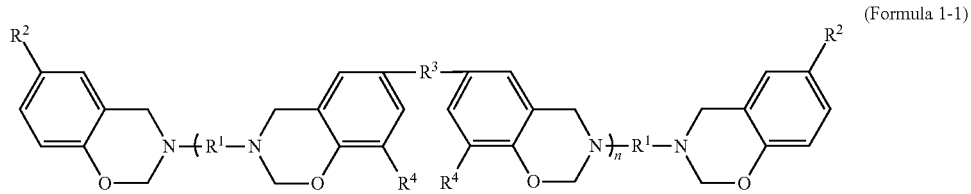

(Formula 1-1)

wherein n ranges from 1 to 5, and $R^1$ is selected from a group consisting of:

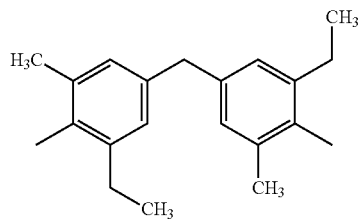
(Formula 1-2)

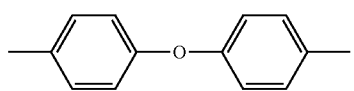
(Formula 1-3)

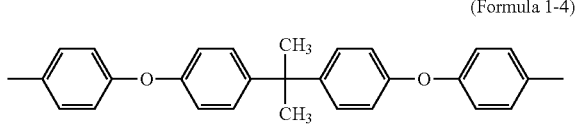
(Formula 1-4)

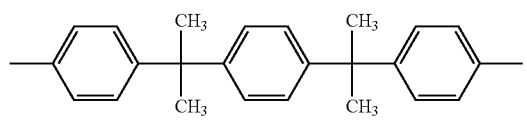
(Formula 1-5)

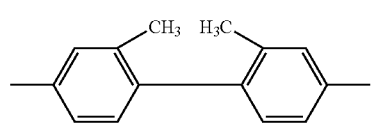
(Formula 1-6)

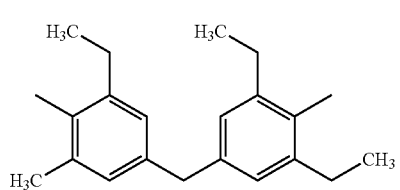
(Formula 1-7)

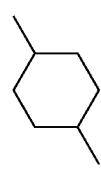
(Formula 1-8)

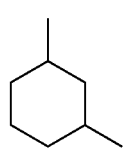
(Formula 1-9)

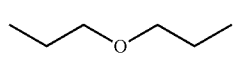
(Formula 1-10)

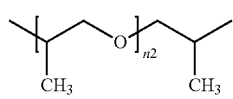
(Formula 1-11)

wherein n2 ranges from 2 to 6,

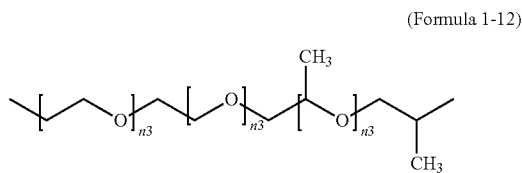
(Formula 1-12)

wherein n3 ranges from 1 to 5,

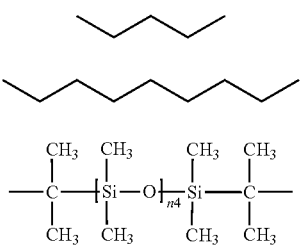
(Formula 1-13)

(Formula 1-14)

(Formula 1-15)

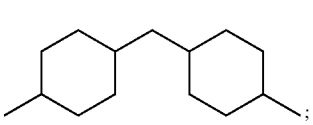

wherein n4 ranges from 2 to 10, (Formula 1-16)

wherein $R^2$ is selected from a C1-C10 carbon chain or a group consisting of:

—H (Formula 1-17)

(Formula 1-18)

(Formula 1-19)

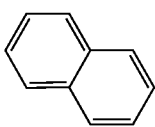
(Formula 1-20)

—$CH_3$ (Formula 1-21)

—$CH_2$—$CH_3$ (Formula 1-22)

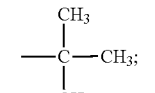
(Formula 1-23)

wherein R³ is a single bond or selected from a group consisting of:

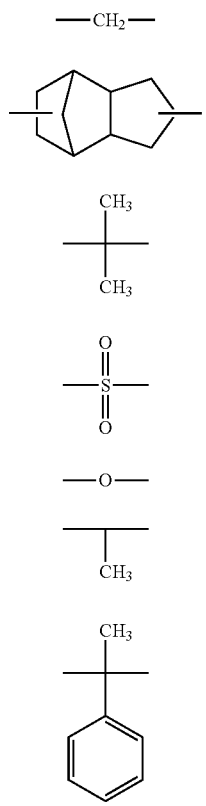

(Formula 1-24)
(Formula 1-25)
(Formula 1-26)
(Formula 1-27)
(Formula 1-28)
(Formula 1-29)
(Formula 1-30)

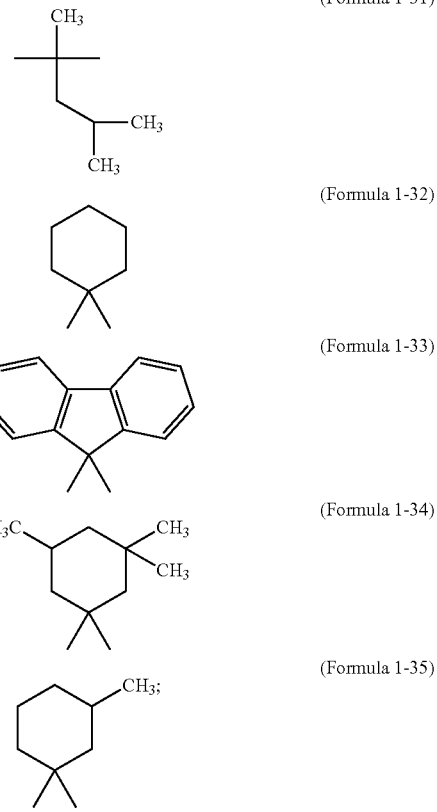

(Formula 1-31)
(Formula 1-32)
(Formula 1-33)
(Formula 1-34)
(Formula 1-35)

wherein R⁴ is H, C1-C12 alkyl or allyl; and
wherein R⁵ is a benzene ring, H, or C1-C12 alkyl.

To achieve the above objective, the present invention further provides a resin of the following formula:

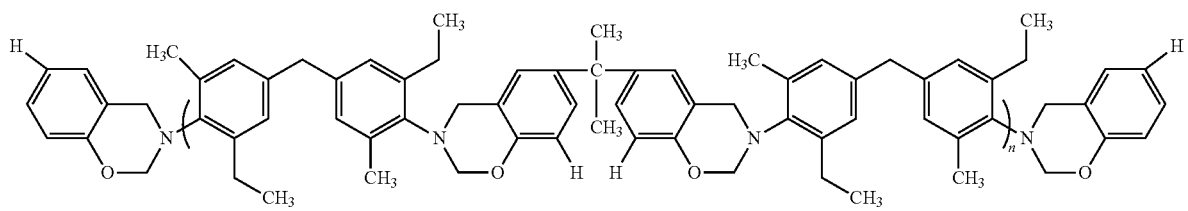

wherein n ranges from 1 to 5.

To achieve the above objective, the present invention still further provides a resin of the following formula:

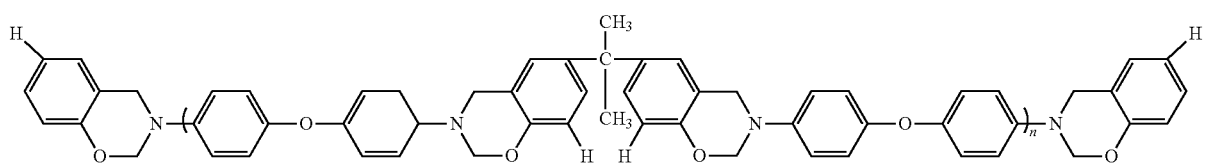

wherein n ranges from 1 to 5.

Based on the characteristics of molecular design, the present invention provides a long-chain benzoxazine resin containing a crosslinkable functional group. The benzoxazine resin of the present invention has high toughness and excellent mechanical properties (e.g., tensile strength and elongation), and can improve the problems of the copper clad laminate made from the existing polybenzoxazine, namely, poor brittleness, poor machinability and poor dimensional stability. Based on the selection of different $R^1$, the long chain can improve the mechanical properties (e.g., tensile strength and elongation) and can reduce the generation of porous dehiscence and white stripes after being applied in copper clad laminates. Aliphatic series can improve the electrical properties of the benzoxazine resin, can increase impedance and reduce Dk/Df, and can enhance the insulation resistance and reduce high-frequency loss after being applied in copper clad laminates. Moreover, aliphatic series can further increase the solubility of the solvent in the benzoxazine resin and can reduce the amount of the solvent used after being applied in copper clad laminates. Furthermore, the present invention has the advantages of environmental protection and low costs. The cyclic chain, long chain, cyclic aliphatic and Si can reduce the moisture absorption of the benzoxazine resin and Dk/Df; and aromatic series can enhance the heat resistance and mechanical properties of the benzoxazine resin. Further, the printed circuit board prepared by the benzoxazine resin disclosed herein has flame retardation being up to a level UL94 V0, and also has excellent heat resistance, high dimensional stability, high mechanical strength, high toughness, ion migration resistance and excellent processability.

DETAILED DESCRIPTION OF THE PREFERRED EMBODIMENTS

The present invention discloses a benzoxazine resin having a structure of the following Formula 1-1:

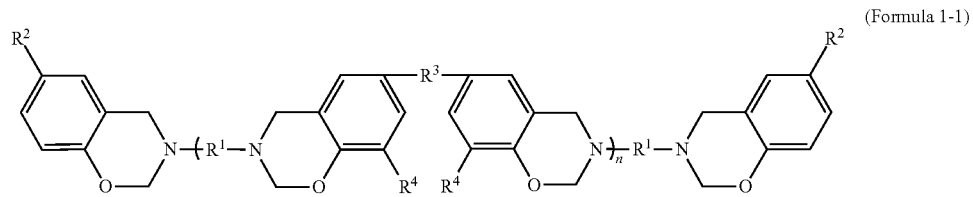

(Formula 1-1)

wherein n ranges from 1 to 5, and may be an integer or a non-integer, and $R^1$ is selected from a group consisting of:

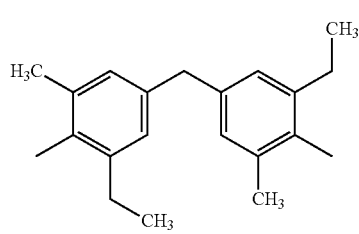

(Formula 1-2)

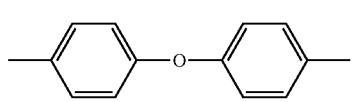

(Formula 1-3)

-continued

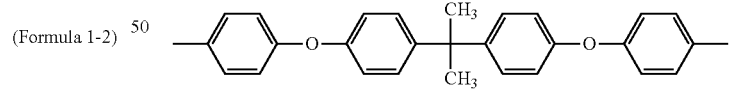

(Formula 1-4)

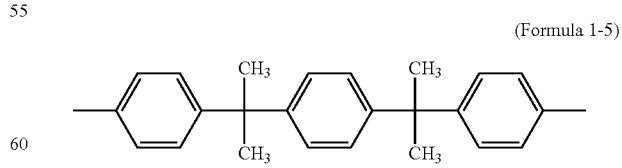

(Formula 1-5)

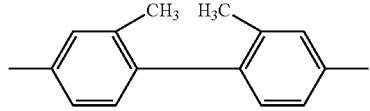

(Formula 1-6)

-continued

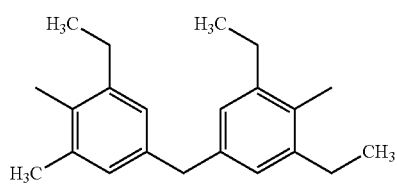 (Formula 1-7)

 (Formula 1-8)

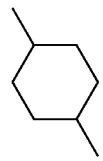 (Formula 1-9)

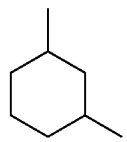 (Formula 1-10)

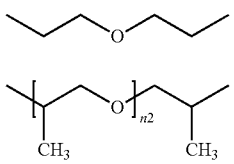 (Formula 1-11)

wherein n2 ranges from 2 to 6,

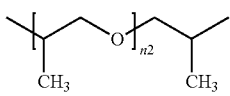 (Formula 1-12)

wherein n3 ranges from 1 to 5,

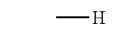 (Formula 1-13)

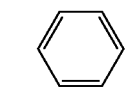 (Formula 1-14)

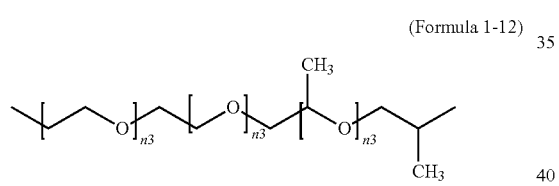 (Formula 1-15)

wherein n4 ranges from 2 to 10,

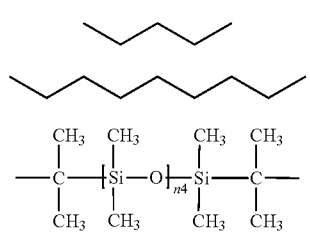 (Formula 1-16)

;

wherein $R^2$ is selected from a C1-C10 carbon chain or a group consisting of:

—H  (Formula 1-17)

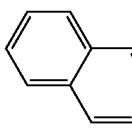 (Formula 1-18)

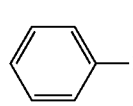 (Formula 1-19)

 (Formula 1-20)

—CH$_3$  (Formula 1-21)

—CH$_2$—CH$_3$  (Formula 1-22)

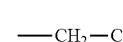 (Formula 1-23)

wherein $R^3$ is a single bond or selected from a group consisting of:

—CH$_2$—  (Formula 1-24)

 (Formula 1-25)

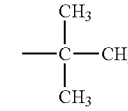 (Formula 1-26)

 (Formula 1-27)

—O—  (Formula 1-28)

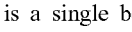 (Formula 1-29)

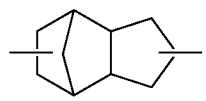 (Formula 1-30)

 (Formula 1-31)

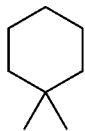 (Formula 1-32)

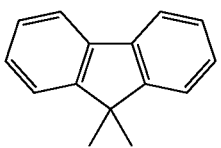 (Formula 1-33)

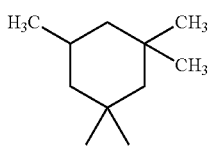 (Formula 1-34)

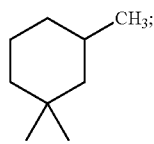 (Formula 1-35)

wherein $R^4$ is H, C1-C12 alkyl or allyl; and
wherein $R^5$ is a benzene ring, H, or C1-C12 alkyl.

Based on the selection of different $R^1$, the long chain can improve the mechanical properties (e.g., tensile strength and elongation) and can reduce the generation of porous dehiscence and white stripes after being applied in copper clad laminates. Aliphatic series can improve the electrical properties of the benzoxazine resin, can increase impedance and reduce Dk/Df, and can enhance the insulation resistance and reduce high-frequency loss after being applied in copper clad laminates. Moreover, aliphatic series can further increase the solubility of the solvent in the benzoxazine resin and can reduce the amount of the solvent used after being applied in copper clad laminates. Furthermore, the present invention has the advantages of environmental protection and low costs. The cyclic chain, long chain, cyclic aliphatic and Si can reduce the moisture absorption of the benzoxazine resin and Dk/Df; and aromatic series can enhance the heat resistance and mechanical properties of the benzoxazine resin.

With respect to formula 1-3 of the $R^1$ of the benzoxazine resin in the present invention, due to the use of an ether group compound, compared with the DAM((4,4'-diaminodiphenyl)methane) used in the prior art, Formula 1-3 has excellent machinability, thus substantially improving the machinability of the benzoxazine resin (the same as Formula 1-3, Formula 1-4, Formula 1-10, Formula 1-11, Formula 1-12, and Formula 1-15). In another aspect, when the $R^1$ of the benzoxazine resin in the present invention is Formula 1-2, Formula 1-4, Formula 1-5, Formula 1-6, Formula 1-7, Formula 1-11, Formula 1-12 and Formula 1-15, compared with the prior art listed above, the structure of the side chain can improve the solubility and also enhance machinability, and has positive effects on the appearance and physical properties of a finished product.

When the $R^1$ of the benzoxazine resin in the present invention is Formula 1-8, Formula 1-9, Formula 1-16, the cyclic aromatic chain also provides low moisture absorption and low Dk/Df, and improves the heat resistance and mechanical properties. When the $R^1$ of the benzoxazine resin in the present invention is Formula 1-13 and Formula 1-14, the aliphatic long chain provides excellent mechanical properties.

According to an example of the present invention, a resin having a structure of the following formula (hereafter referred to as BZ-1) is provided. In the Formula 1-1, $R^1$ is

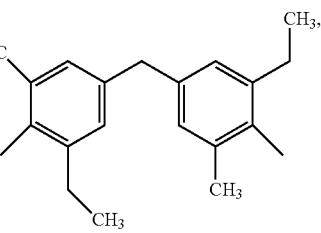

$R^2$ is H, $R^3$ is

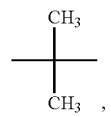

and $R^4$ is H.

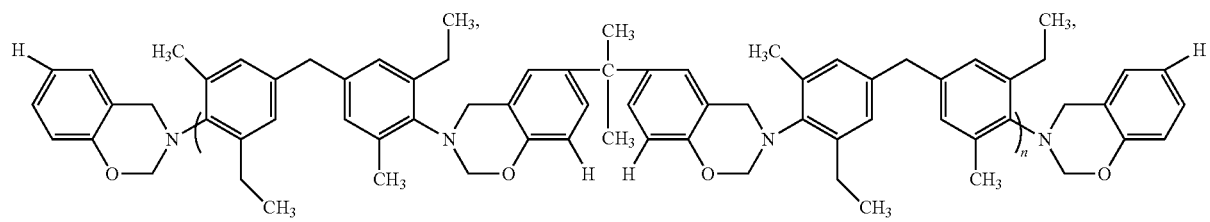

According to an example of the present invention, a resin having a structure of the following formula (hereafter referred to as BZ-7) is provided.

In the Formula 1-1, $R^1$ is

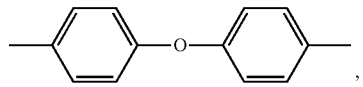, $R^2$ is H, $R^3$ is

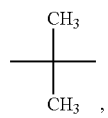, and $R^4$ is H.

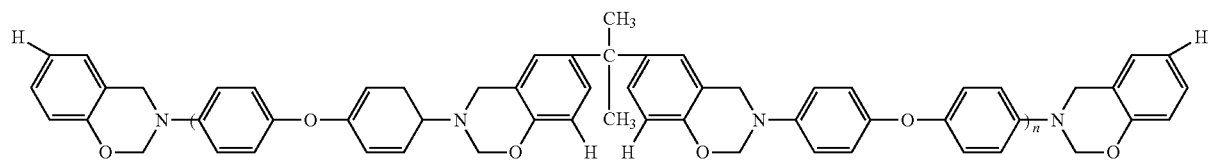

BZ-1 and BZ-7 have balanced excellent performance at the glass transition temperature ($T_g$), Z-axis coefficient of thermal expansion (Z-CTE) and tear resistance. Therefore, BZ-1 and BZ-7 are especially suitable for mass production in practice.

In one example, the material used for synthesizing the benzoxazine resin of the Formula 1-1 mainly includes diamine, diphenol, monophenol and formaldehyde. In preparation, diamine, diphenol and monophenol are firstly added to a separable four-necked reaction flask to obtain a solution; the reaction flask is provided with a heating unit, a thermometer, a blender, a cooling pipe, a dripping unit and a reduced-pressure recovery unit; methylbenzene is used as a solvent and then formaldehyde is dripped into the solution. The general formula of the reaction is as follows:

$$H_2N-Z1-NH_2 \;+\; HO-Z2-OH \;+\; Z3-OH \;+\; -(H_2C=O)- \longrightarrow$$

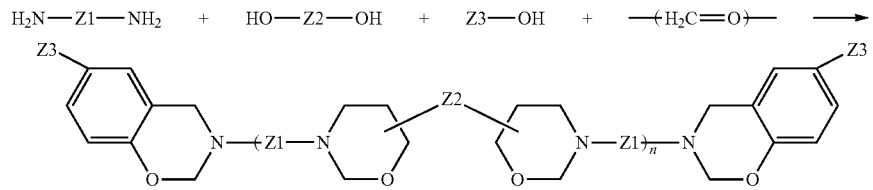

wherein n ranges from 1 to 5, and may be an integer or a non-integer. For instance, Z1 is selected from monovalent alkyl, monovalent oxyl, and halogeno. Z2 and/or Z3 may be the following compounds:

 (Formula 1-36)

-continued

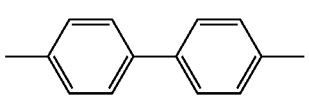 (Formula 1-37)

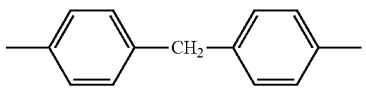 (Formula 1-38)

(Formula 1-39)

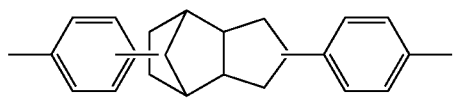

(Formula 1-40)

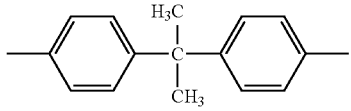

(Formula 1-41)

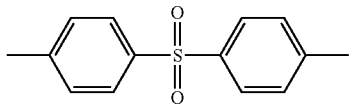

(Formula 1-42)

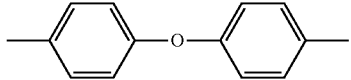

The synthetic method of the resin disclosed above will be described below.

Synthesis Example 1-1

846 g of di-(3-methyl-4-amino-6-ethyl)phenylmethane(4,4'-Methylenebis(2-ethyl-6-methylaniline), (MMEA), 228 g of bisphenol A (BPA), 376 g of phenol and 600 g of methylbenzene were added to a 3 L of separable four-necked reaction flask to obtain a solution; the solution was warmed up to about 40° C. and stirred evenly within 20 min, then 819 g of methylbenzene solution (containing 44 wt. % formaldehyde) was added dropwise to the solution; and the solution was continuously heated up to about 90° C., maintained at 90° C. and subjected to reaction for 3 h.

After reaction for 3 h, the heating was stopped, and the solution was stirred and subjected to standing for 20 min; after the solution was divided into two layers, the upper layer of aqueous phase and micro emulsion were removed, then the remaining solution was heated up to about 90° C.; solvent was recovered by means of a reduced pressure way (lower than about 90 mmHg), after the temperature was about 130° C. and all the solvent was recovered, about 1730 g of nitrogen-oxygen heterocyclic compounds were obtained (namely, the benzoxazine resin).

Synthesis Example 1-2

600 g of 4,4'-oxydianiline (ODA), 456 g of bisphenol A (BPA), 188 g of phenol and 600 g of methylbenzene were added to a separable four-necked reaction flask to obtain a solution; the solution was warmed up to about 40° C. and stirred evenly while 819 g of methylbenzene solution (containing 44 wt. % formaldehyde) was added dropwise thereto within 20 min; and the solution was continuously heated up to about 90° C., and the solution was maintained at 90° C. and subjected to reaction for 3 h. The reaction formula was as follows.

After reaction for 3 h, the heating was stopped, the solution was stirred and subjected to standing for 20 min; after the solution was divided into two layers, the upper layer of aqueous phase and micro emulsion were removed, the remaining solution was then heated up to about 90° C.; solvent was recovered by means of a reduced pressure way (lower than about 90 mmHg), after the temperature was about 130° C. and all the solvent was recovered, about 1385 g of nitrogen-oxygen heterocyclic compounds were obtained (namely, the benzoxazine resin).

Synthesis Examples 1-3 to 1-8

The synthetic method is as described above. The selected materials and ratios are the same as those in Synthesis Examples 1-1 and 1-2, as shown in Table 1 below. Synthesis Examples 1-1 to 1-8 were respectively corresponding to BZ-1 to BZ-8 in Table 1. Number in Table 1 is the molar ratio of monomers in each Synthesis Example.

In application, the resin of Formula 1-1 may be mixed with other materials. In one example, the resin of Formula 1-1 may be mixed with a filler, a thermosetting resin, a reinforced material and a toughening agent, then dissolved or dispersed into a solvent to prepare into a paint-like form. The solvent may be any inert solvent capable of dissolving or dispersing the above each component, but not reacting with the component, including but not limited to methylbenzene, γ-butyrolactone, methyl ethyl ketone, cyclohexanone, butanone, acetone, xylene, methyl isobutyl ketone, N,N-dimethyl formamide (DMF), N,N-dimethyl acetamide (DMAc), N-methyl-pyrolidone (NMP), or a combination thereof.

In another aspect, the present invention further discloses a resin composition and a copper clad laminate made from the resin composition. The resin composition includes 30-50 wt. % of benzoxazine resin (as shown in Formula 1-1), 35-55 wt. % of a filler, 6-15 wt. % of a thermosetting resin and 8-20 wt. % of a toughening agent.

To specifically describe the technical solution of the present invention, a metal clad laminate plate for the printed circuit board made from benzoxazine according to the Formula 1-1 of the present invention is set as an example. Compared with other Comparative Examples, the benzoxazine resin used in the Comparative Example has a chemical formula of the following Formula 2-1. Table 2 shows formulations of different examples; the unit is a weight ratio.

(Formula 2-1)

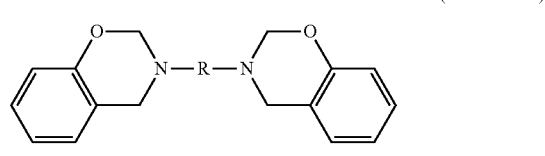

When the benzoxazine resin of Formula 2-1 is ODA-BZ, R is represented by the following Formula 2-2:

(Formula 2-2)

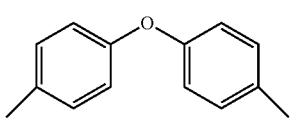

When the benzoxazine resin of Formula 2-1 is MDA-BZ, R is represented by the following Formula 2-3:

(Formula 2-3)

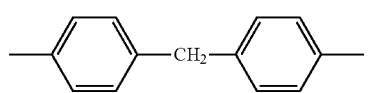

Benzoxazine of Formula 1-1, a filler, a thermosetting resin and a toughening agent were mixed in a solvent. The filler was silicon dioxide ($SiO_2$) having a grain size of 10 μm; the thermosetting resin was a bismaleimide resin (BMI) with a model of KI-70 purchased from Daiwa Chemical Industries Co., LTD. The toughening agent was a butadiene-styrene copolymer with a model of Ricon® 100; the solvent was a mixture of methylbenzene, methyl ethyl ketone and γ-butyrolactone to obtain a paint; a base material (or called a reinforced material) was impregnated into the paint by a roll coater, and then dried at 175° C., thus obtaining semisolid preimpregnated sheets. In this example, the base material was a glass fiber cloth with a model of 2116 and a thickness of 0.08 mm; the paint content in the preimpregnated sheet was 54 wt. %.

The four preimpregnated sheets were piled up, and then a piece of 0.5 oz copper clad was respectively disposed at the top and bottom of the preimpregnated sheets. Afterwards, the obtained sheets were placed into a hot press for hot-pressing solidification at high temperature, and heated up to 200° C.-220° C. at a heating rate of 3.0° C./min, then hot-pressed for 180 min at a pressure of 15 kg/cm² and at the temperature, and cooled to room temperature, thus preparing a double-sided copper clad laminate plate.

The glass transition temperature ($T_g$), Z-axis coefficient of thermal expansion (Z-CTE), tear resistance and heat resistance test of the double-sided copper clad laminate plate obtained in the above process were measured. The results are shown in Table 3.

$T_g$ was measured by a dynamic thermomechanical analyzer (DMA) in accordance with the method specified the IPC-TM-650 2.4.24.4 regulation. Z-CTE was measured by a thermal mechanical analyzer (TMA) in accordance with the method specified in the IPC-TM-650 2.4.24.5 regulation. The change rate of coefficient of thermal expansion in the Z-axis direction was measured lower than the $T_g$ temperature (within 50° C.-260° C.). The tear resistance refers to the strength of force by which a copper clad having a width of ⅛ inches can be torn from the board vertically. The heat resistance test was performed as follows: the dried double-sided copper clad laminate plate was soaked into a 300° C. tin soldering bath for 100 s and repeated for 3 times to observe the appearance; if there was bubble or bulge on the appearance, the heat resistance was poor; if there was no bubble or bulge on the appearance, the heat resistance was excellent, recorded as '○'.

TABLE 1

|  |  | BZ-1 | BZ-2 | BZ-3 | BZ-4 | BZ-5 | BZ-6 | BZ-7 | BZ-8 |
|---|---|---|---|---|---|---|---|---|---|
| Diamine | MMEA | 3 | 3 | 3 | 3 | 3 | 3 | — | — |
|  | ODA | — | — | — | — | — | — | 3 | — |
|  | BAPP | — | — | — | — | — | — | — | 3 |
| Bisphenol | BPA | 1 | 2 | — | — | — | 1 | 1 | 1 |
|  | BPF | — | — | 1 | — | — | — | — | — |
|  | DOD | — | — | — | 1 | — | — | — | — |
|  | DCDP-Diol | — | — | — | — | 1 | — | — | — |
| Phenol | Phenol | 4 | 2 | 4 | 4 | 4 | — | 4 | 4 |
|  | 2-Naphthol | — | — | — | — | — | 4 | — | — |
| Aldehyde | Formaldehyde | 12 | 12 | 12 | 12 | 12 | 12 | 12 | 12 |

TABLE 2

|  | Example 1 | Example 2 | Example 3 | Example 4 | Example 5 | Example 6 | Example 7 | Example 8 |
|---|---|---|---|---|---|---|---|---|
| BZ-1 | 33 | — | — | — | — | — | — | — |
| BZ-2 | — | 33 | — | — | — | — | — | — |
| BZ-3 | — | — | 33 | — | — | — | — | — |
| BZ-4 | — | — | — | 33 | — | — | — | — |
| BZ-5 | — | — | — | — | 33 | — | — | — |
| BZ-6 | — | — | — | — | — | 33 | — | — |
| BZ-7 | — | — | — | — | — | — | 33 | — |
| BZ-8 | — | — | — | — | — | — | — | 33 |
| ODA-BZ | — | — | — | — | — | — | — | — |
| MDA-BZ | — | — | — | — | — | — | — | — |
| Filler | 43 | 43 | 43 | 43 | 43 | 43 | 43 | 43 |
| Thermosetting resin | 13 | 13 | 13 | 13 | 13 | 13 | 13 | 13 |
| Toughening agent | 11 | 11 | 11 | 11 | 11 | 11 | 11 | 11 |

|  | Example 9 | Example 10 | Example 11 | Example 12 | Comparative Example 1 | Comparative Example 2 | Comparative Example 3 |
|---|---|---|---|---|---|---|---|
| BZ-1 | 45 | 39 | — | — | — | — | — |
| BZ-2 | — | — | 32 | 28 | — | — | — |
| BZ-3 | — | — | — | — | — | — | — |
| BZ-4 | — | — | — | — | — | — | — |
| BZ-5 | — | — | — | — | — | — | — |
| BZ-6 | — | — | — | — | — | — | — |
| BZ-7 | — | — | — | — | — | — | — |
| BZ-8 | — | — | — | — | — | — | — |
| ODA-BZ | — | — | — | — | 33 | — | 31 |

TABLE 2-continued

| | | | | | | | |
|---|---|---|---|---|---|---|---|
| MDA-BZ | — | — | — | — | — | 33 | |
| Filler | 35 | 39 | 43 | 48 | 43 | 43 | 41 |
| Thermosetting resin | 11 | 12 | 9 | 14 | 13 | 13 | 12 |
| Toughening agent | 9 | 10 | 16 | 10 | 11 | 11 | 16 |

TABLE 3

| | Example 1 | Example 2 | Example 3 | Example 4 | Example 5 | Example 6 | Example 7 | Example 8 |
|---|---|---|---|---|---|---|---|---|
| $T_g$ (° C.) | 203 | 201 | 198 | 202 | 187 | 209 | 183 | 182 |
| Z-CTE (%) | 4.2 | 4.4 | 4.3 | 4.2 | 4.6 | 4.1 | 4.6 | 4.8 |
| Tear resistance (lb/ft) | 6.6 | 6.8 | 6.9 | 6.8 | 6.5 | 6.3 | 6.2 | 7.2 |
| Heat resistance test | ○ | ○ | ○ | ○ | ○ | ○ | ○ | ○ |

| | Example 9 | Example 10 | Example 11 | Example 12 | Comparative Example 1 | Comparative Example 2 | Comparative Example 3 |
|---|---|---|---|---|---|---|---|
| $T_g$ (° C.) | 212 | 207 | 198 | 215 | 176 | 172 | 167 |
| Z-CTE (%) | 3.6 | 4.1 | 4.1 | 3.6 | 5.3 | 5.5 | 5.8 |
| Tear resistance (lb/ft) | 6.5 | 6.4 | 6.6 | 6.6 | 5.6 | 5.4 | 6.1 |
| Heat resistance test | ○ | ○ | ○ | ○ | ○ | ○ | ○ |

What is claimed is:

1. A resin, comprising a compound of the following Formula 1-1:

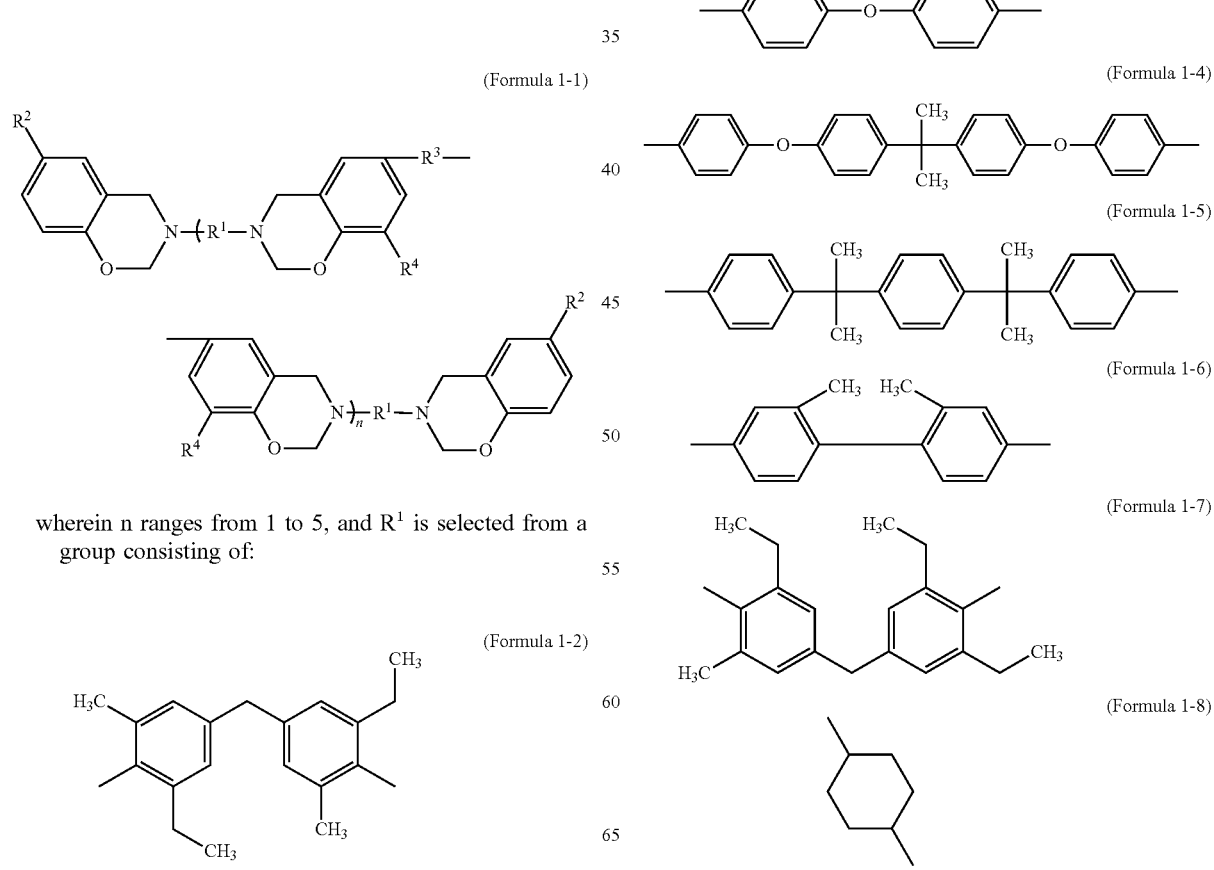

wherein n ranges from 1 to 5, and $R^1$ is selected from a group consisting of:

-continued

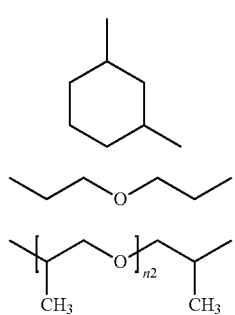
(Formula 1-9)

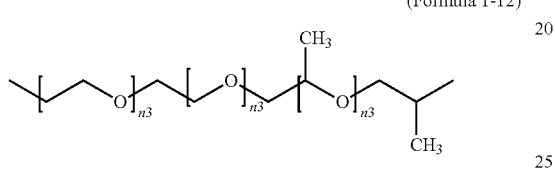
(Formula 1-10)

(Formula 1-11)

wherein n2 ranges from 2 to 6,

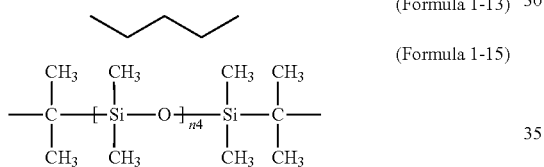
(Formula 1-12)

wherein n3 ranges from 1 to 5,

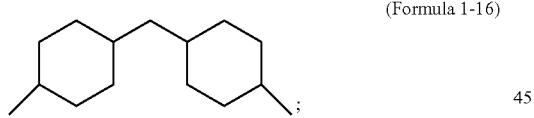
(Formula 1-13)

(Formula 1-15)

wherein n4 ranges from 2 to 10, (Formula 1-16)

wherein $R^2$ is selected from a C1-C10 carbon chain or a group consisting of:

—H
(Formula 1-17)

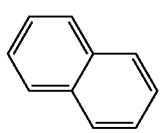
(Formula 1-18)

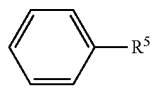
(Formula 1-19)

(Formula 1-20)

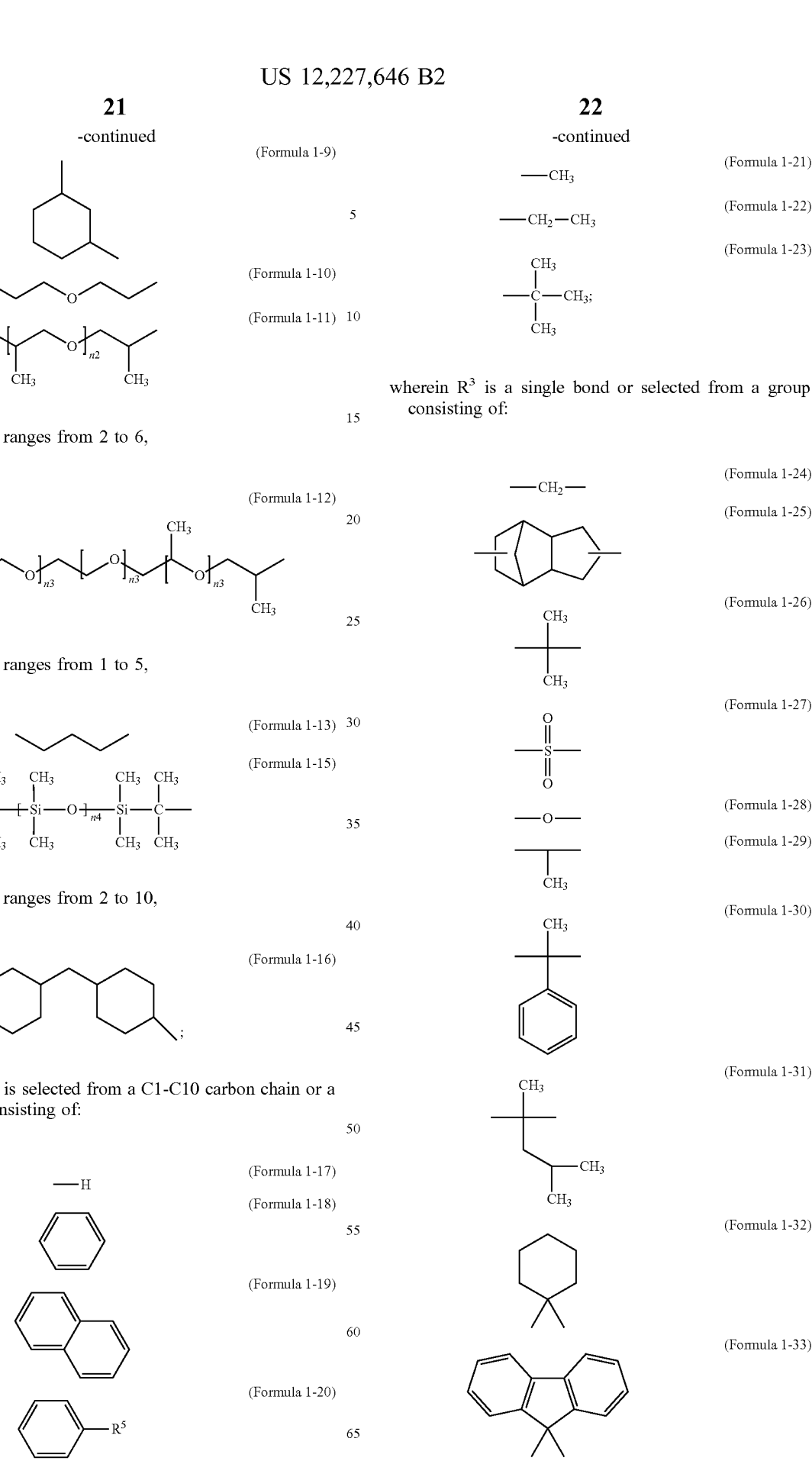

—CH₃ (Formula 1-21)

—CH₂—CH₃ (Formula 1-22)

(Formula 1-23)

wherein $R^3$ is a single bond or selected from a group consisting of:

—CH₂— (Formula 1-24)

(Formula 1-25)

(Formula 1-26)

(Formula 1-27)

—O— (Formula 1-28)

(Formula 1-29)

(Formula 1-30)

(Formula 1-31)

(Formula 1-32)

(Formula 1-33)

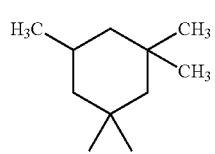 (Formula 1-34)
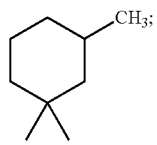 (Formula 1-35)
wherein $R^4$ is H, C1-C12 alkyl or allyl; and
wherein $R^5$ is a benzene ring, H, or C1-C12 alkyl.
2. A resin composition, comprising 30-50 wt. % of the benzoxazine resin of claim 1, 35-55 wt. % of a filler, 6-15 wt. % of a thermosetting resin, and 8-20 wt. % of a toughening agent.
3. A copper clad laminate, made of the resin composition of claim 2.
* * * * *